United States Patent

Goscenski, Jr. et al.

[11] Patent Number: 5,092,825
[45] Date of Patent: Mar. 3, 1992

[54] MODULATING LIMITED SLIP DIFFERENTIAL

[75] Inventors: Edward J. Goscenski, Jr., Battle Creek; David A. Janson, Plymouth, both of Mich.

[73] Assignee: Eaton Corporation, Cleveland, Ohio

[21] Appl. No.: 704,504

[22] Filed: May 23, 1991

Related U.S. Application Data

[63] Continuation-in-part of Ser. No. 548,317, Jul. 2, 1990, Pat. No. 5,019,021.

[51] Int. Cl.⁵ .............................................. F16H 1/445
[52] U.S. Cl. ..................................... 475/150; 475/231
[58] Field of Search ................................. 475/150, 231

[56] References Cited

U.S. PATENT DOCUMENTS

| | | | |
|---|---|---|---|
| 3,138,970 | 6/1964 | Costa et al. | 475/86 |
| 4,644,823 | 2/1987 | Mueller | 475/86 |
| 4,805,486 | 2/1989 | Hagiwara et al. | 475/150 |
| 5,007,886 | 4/1991 | Holmquist et al. | 475/231 |

Primary Examiner—Dirk Wright
Attorney, Agent, or Firm—L. J. Kasper

[57] ABSTRACT

A modulating limited slip differential is disclosed of the type including a gear case (11), an actuating mechanism (51) being operable to apply a force to a clutch pack (41) to retard rotation between a side gear (25) and the gear case. The actuating mechanism includes an outer actuating plate (55) which normally rotates at the same speed as the gear case. The differential includes an electromagnetic actuator (81) which is operable to cause rotation of the outer actuating plate relative to the gear case, resulting in ramping of a plurality of cam balls (79) and axial movement of an inner actuating plate (53) to load the clutch pack. The cam balls are disposed in openings (69) in an end wall (67) of the gear case, the openings being circular, and just slightly oversized, relative to the cam balls to maximize the amount of metal in the end wall, and therefor, the torque transmitting capacity of the gear case.

8 Claims, 4 Drawing Sheets

MODULATING LIMITED SLIP DIFFERENTIAL

CROSS REFERENCED TO RELATED APPLICATION

This application is a Continuation-In-Part of copending U.S. application Ser. No. 548,317, filed July 2, 1990 now U.S. Pat. No. 5,019,021.

BACKGROUND OF THE DISCLOSURE

The present invention relates to limited slip differentials, and more particularly, to such differentials of the type in which the means for retarding differentiating action may be modulated in response to an external input signal.

Limited slip differentials of the type to which the present invention relates typically include a gear case defining a gear chamber, and disposed therein, a differential gear set including at least one input pinion gear, and a pair of output side gears. A clutch pack is typically disposed between at least one of the side gears, and an adjacent surface of the gear case, such that the clutch pack is operable to retard, or even prevent, relative rotation between the gear case and the one side gear. Although the present invention is not limited to limited slip differentials in which the clutch pack is disposed axially between one of the side gears and an adjacent surface of the gear case, the present invention is especially advantageous when used in connection with a limited slip differential having such an arrangement, and the invention will be described in connection therewith.

In many limited slip differentials, some sort of actuating mechanism is provided to actuate or move the clutch pack from its disengaged condition to an engaged condition.

One of the current trends in the field of vehicle traction modifiers involves the desire to be able to actuate the clutch pack in response to an external input signal, rather than only in response to the sensing of a predetermined speed differential, as has typically been the case in the prior art.

One prior art approach to providing the ability to modulate a limited slip differential has been by the application of a varying hydraulic pressure to a piston disposed in engagement with the clutch pack, such that the "bias torque" (i.e., the amount of torque transferred from the low traction wheel to the high traction wheel as a result of clutch pack engagement) would vary with variations in hydraulic pressure. Such a limited slip differential is illustrated and described in U.S. Pat. No. 3,138,970. Differentials made in accordance with the teachings of U.S. Pat. No. 3,138,970 have not become commercially successful, primarily because the overall design is excessively complex, requiring several hydraulic lines, and expensive and complex rotating hydraulic seal arrangements.

U.S. Pat. No. 4,644,823 discloses a limited slip differential in which a hydraulic signal is applied to a piston-like member of a bearing assembly, such that hydraulic pressure biases the entire bearing assembly, and several other members, in an axial direction, eventually loading the differential clutch pack. Again, the device of the referenced patent is excessively complex, such that it would require major redesign of any of the commercially available limited slip differentials, and most likely, substantial redesign of the surrounding differential housing, which is particularly unacceptable to the vehicle original equipment manufacturers.

U.S. Pat. No. 4,805,486 discloses a limited slip differential having a clutch pack in which loading of the clutch pack occurs in response to ramping of a ball-ramp actuator which is disposed external to the differential case. Ramping of the ball ramp actuator is initiated by rotation of a servo-motor, and by means of a parallel-shaft gear train, which also would require substantial redesign of the surrounding differential housing.

SUMMARY OF THE INVENTION

Accordingly, it is an object of the present invention to provide an improved limited slip differential of the type in which the clutch pack may be actuated, in a modulating fashion, in response to an external input signal, wherein the differential overcomes the problems associated with the prior art devices.

More specifically, it is an object of the present invention to provide an improved limited slip differential in which the clutch actuating means is a relatively simple cam means which is disposed at least partially external to the differential case, but does not require substantial redesign of the differential, or any change in the overall dimensions or configuration of the cases of limited slip differentials which are now commercially available.

It is another object of the present invention to provide an improved limited slip differential in which part of the clutch actuating mechanism passes through an end wall of the differential case, but is configured in such a manner as to maximize the amount of metal in the end wall of the case and therefor the torque transmitting capacity of the differential case.

The above and other objects of the present invention are accomplished by the provision of an improved differential gear mechanism of the type including a gear case defining an axis of rotation and a gear chamber. Differential gear means is disposed in the gear chamber and includes at least one input gear and first and second output gears. Included is means for limiting differentiating action of the differential gear means in response to an input signal, the limiting means including clutch means operable between a disengaged condition and an engaged condition, effective to retard relative rotation between the output gears and the gear case. Also included is an actuating means comprising first and second actuating plates defining a ball and ramp actuator, wherein rotation of the second actuating plate from an unactuated condition to an actuated condition is effective to bias the clutch means toward the engaged condition.

The improved differential gear mechanism is characterized by the second actuating plate being disposed, in the unactuated condition, to rotate with the gear case. The ball ramp actuator comprises a plurality of cam balls, and the second actuating plate defines a plurality of ramp surfaces. The gear case includes an end wall disposed adjacent the second actuating plate, and oriented generally perpendicular to the axis of rotation, the end wall defining a plurality of openings, each of the openings having one of the cam balls disposed therein, and being slightly oversized relative to the cam ball. A means is disposed within the gear case and is operable to transmit axial movement of the cam balls to move the clutch means towards the engaged condition. An actuator is disposed adjacent the gear case and includes means operable in response to the input signal to move from an unactuated position in which the second actuating plate is in the unactuated condition, to an actuated condition in which the means is in operable association with the second actuating plate, effective to cause relative rotation between the second actuating plate and the gear case, to move the second actuating plate to the actuated condition.

DESCRIPTION OF THE PREFERRED EMBODIMENT

Figure 1:
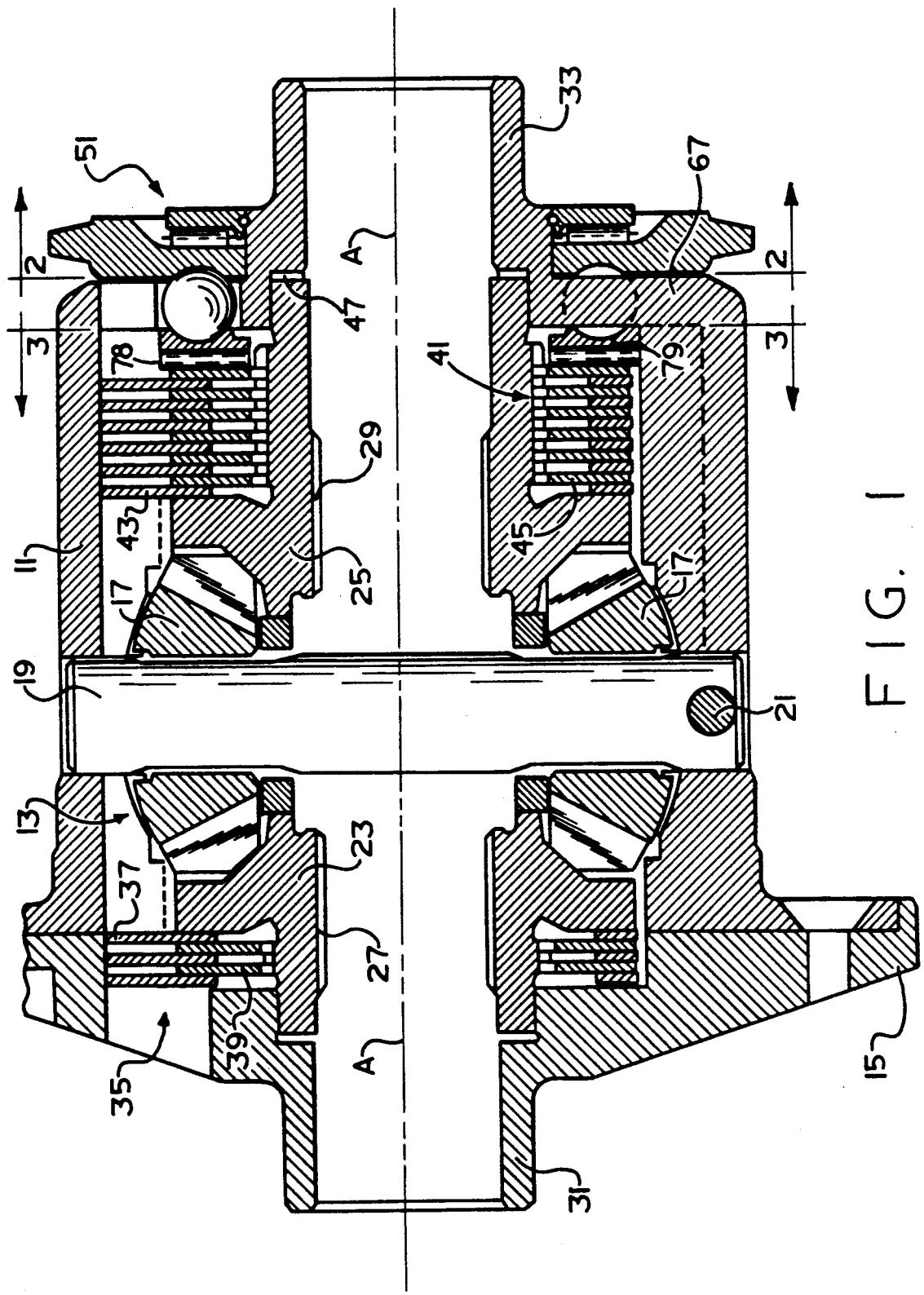
FIG. 1 is an axial cross-section of a limited slip differential made in accordance with the present invention, and taken on line 1—1 of FIG. 3.

Referring now to the drawings, which are not intended to limit the present invention, FIG. 1 is an axial cross-section of a limited slip differential of the type with which the present invention may be utilized. The construction and operation of the limited slip differential illustrated in FIG. 1 may be better understood by reference to U.S. Pat. No. 3,648,545, assigned to the assignee of the present invention, and incorporated herein by reference.

The differential gear mechanism includes a gear case 11 which defines therein a gear chamber, generally designated 13. Torque input to the differential mechanism is typically by means of an input ring gear (not shown herein) which may be attached to a flange 15 of the gear case 11 by any suitable means (not shown herein).

Disposed within the gear chamber 13 is a differential gear set including a pair of input pinion gears 17 which are rotatably mounted on a pinion shaft 19. Typically, the pinion shaft 19 is secured relative to the gear case 11 by any suitable means, such as a locking pin 21. The pinion gears 17 comprise the input gears of the differential gear set, and are in meshing engagement with a pair of side gears 23 and 25. The side gears 23 and 25 define a set of internal, straight splines 27 and 29, respectively, which are adapted to be in splined engagement with mating external splines of a pair of axle shafts (not shown). The gear case 11 includes annular hub portions 31 and 33, on which may be mounted a pair of bearing sets (not shown herein) which are used to provide rotational support for the differential mechanism relative to an outer differential housing H (see FIG. 4).

As is well known to those skilled in the art, during normal, straight-ahead operation of the vehicle, no differentation occurs between the left and right side gears 23 and 25, and therefore, the pinion gears 17 do not rotate relative to the pinion shaft 19. The gear case 11, the pinion gears 17, and the side gears 23 and 25 all rotate about an axis of rotation A as a solid unit.

Under certain operating conditions, such as when the vehicle is turning, or a slight difference in the tire size exists, it is permissible for a certain amount of differentiating action to occur between the side gears 23 and 25. Above a certain, predetermined differential between the speeds of the side gears 23 and 25, it is desirable to retard the relative rotation between the gear case 11 and the side gears 23 and 25, in order to prevent excessive differentiating action, which could lead to a spin-out of one of the drive wheels, resulting in loss of control of the vehicle. There may also be operating conditions wherein it is desirable to actuate the differential mechanism, to prevent any differentiating action, even before such action has a chance to occur.

In order to retard differentiating action, the limited slip differential is provided with a clutch pack, generally designated 35, including three clutch discs 37 which are in engagement with the gear case 11, and two clutch discs 39 which are splined to the side gear 23 in a manner well known to those well skilled in the art. In the subject embodiment, the clutch pack 35 is of the type referred to as "gear active", i.e., it goes from a disengaged condition to an engaged condition in which it retards relative rotation between the gear case 11 and the side gear 23, only in response to gear reaction forces transmitted from the pinion gears 17 to the side gear 23. It should be understood, however, that neither the clutch pack 35, nor the fact that it is of the "gear active" type is an essential feature of the present invention.

In order to further retard differentiating action, the limited slip differential is provided with another clutch pack, generally designated 41, which includes six clutch discs 43 in engagement with the gear case 11 and six clutch discs 45 in splined engagement with the side gear 25. In the subject embodiment, the clutch pack 45 is of the type referred to as "gear inactive", i.e., the clutch pack 41 is not engaged in response to gear reaction forces transmitted from the pinion gear 17 to the side gear 25 during differentiating action. Instead, there is a thrust washer 47 disposed between a transverse end surface of the side gear 25 and an adjacent transverse surface of the gear case 11. When gear reaction forces are transmitted to the side gear 25 during differentiating action, before the side gear 25 moves far enough to the right (in FIG. 1) to engage the clutch pack 41, there is frictional engagement between the side gear 25, the gear case 11, and the thrust washer 47, thus absorbing some of the gear reaction force transmitted from the pinion gears 17 to the side gear 25.

Actuation Mechanism

Referring still to FIG. 1, the limited slip differential of the present invention includes an actuating mechanism, generally designated 51, a portion of which is disposed within the gear case 11, and a portion of which is disposed external thereto.

Figure 4A:
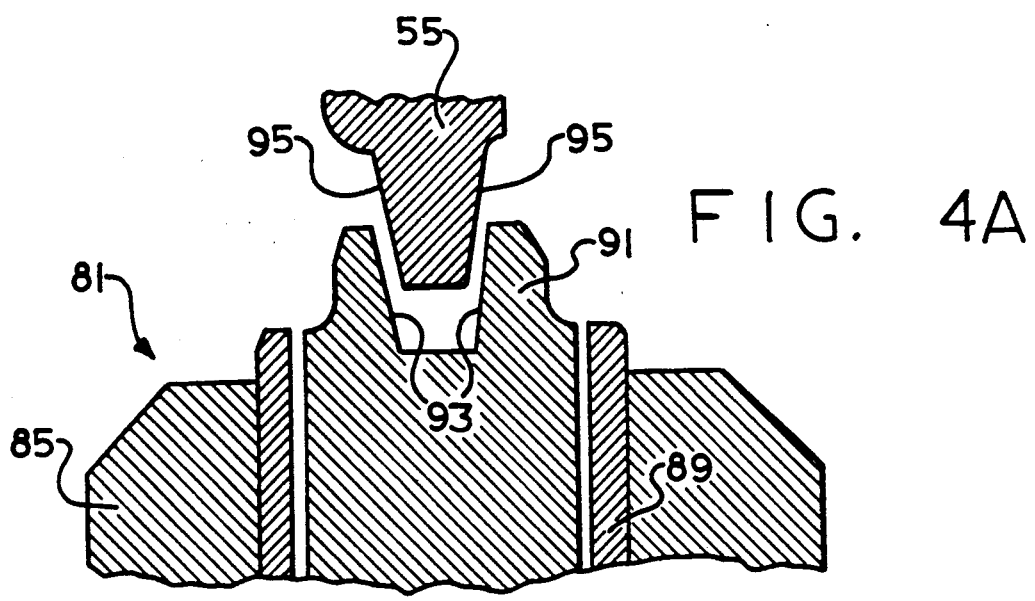
FIG. 4A is a further enlarged, fragmentary, axial cross-section, similar to FIG. 4, illustrating the actuator in its unactuated position.
Figure 4:
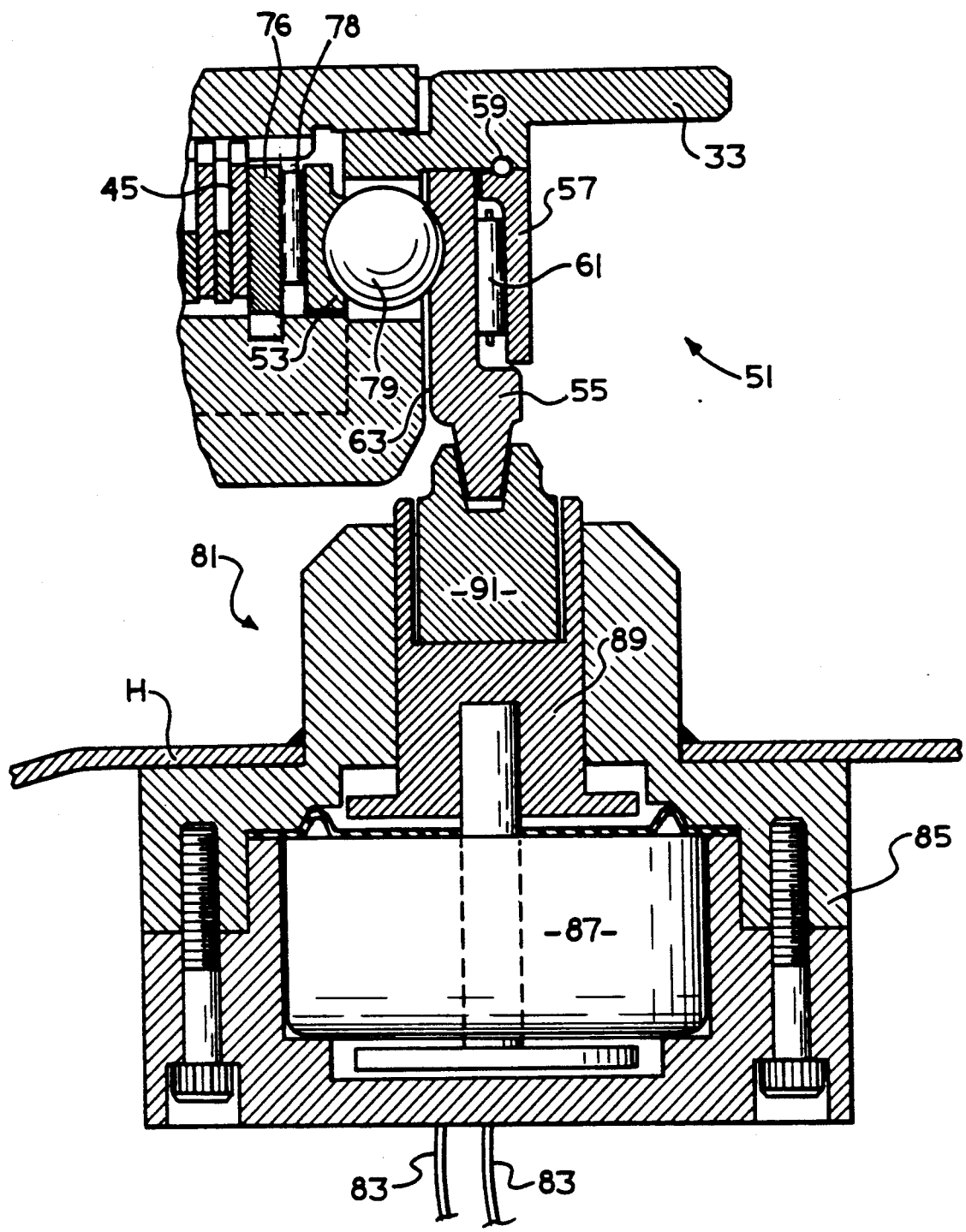
FIG. 4 is an enlarged, fragmentary, axial cross-section, similar to FIG. 1, but illustrating the electromagnetic actuator.

Referring now primarily to FIG. 4, the actuating mechanism 51 includes an annular, inner actuating plate 53 disposed within the gear case 11, and an annular, outer actuating plate 55, disposed external to the gear case 11. Disposed to the right (in FIG. 4) of the plate 55 is a bearing retainer 57, which is retained relative to the hub portion 33 by means of a wire snap ring 59. Disposed axially between the outer plate 55 and the bearing retainer 57 is a thrust bearing 61.

Figure 2:
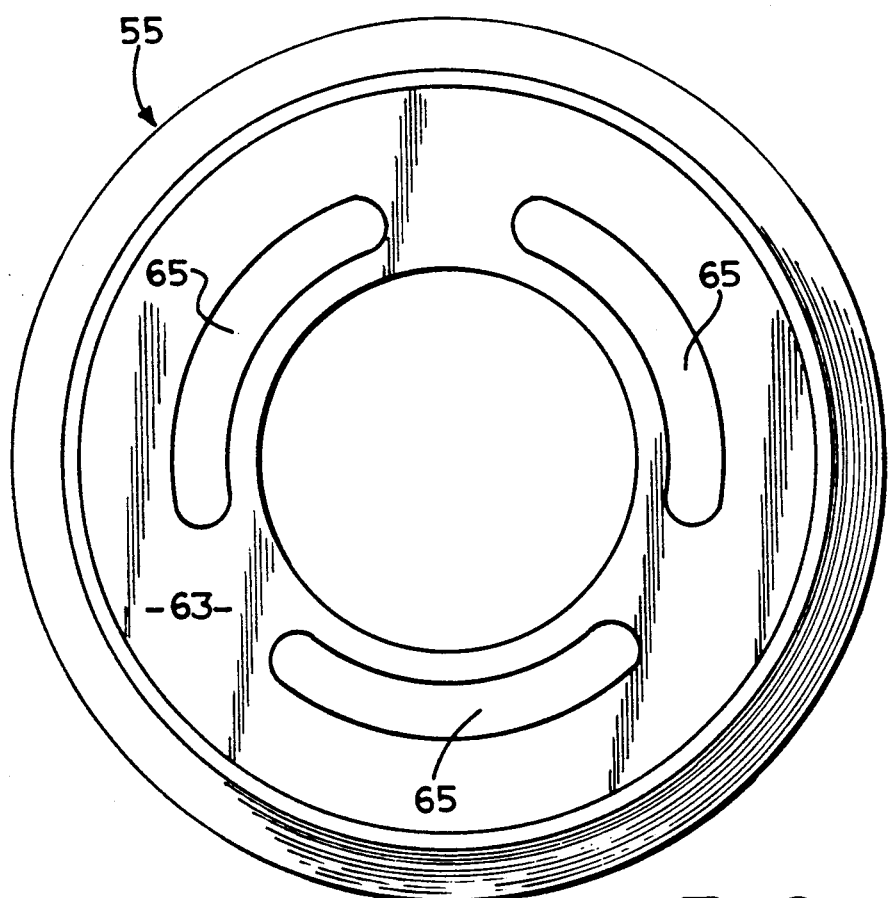
FIG. 2 is a transverse cross-section, taken on line 2—2 of FIG. 1, and on the same scale, illustrating the outer actuating plate.

Referring now primarily to FIG. 2, the outer actuating plate 55 defines an inner surface 63 which is disposed adjacent an axial end surface on the right end (in FIGS. 1 and 4) of the gear case 11. The inner surface 63 defines three substantially identical, generally arcuate ramp surfaces 65 which will be illustrated and described in greater detail subsequently. Preferably, the ramp surfaces 65 are uniformly space in the circumferential direction as may best be seen in FIG. 2.

Figure 3:
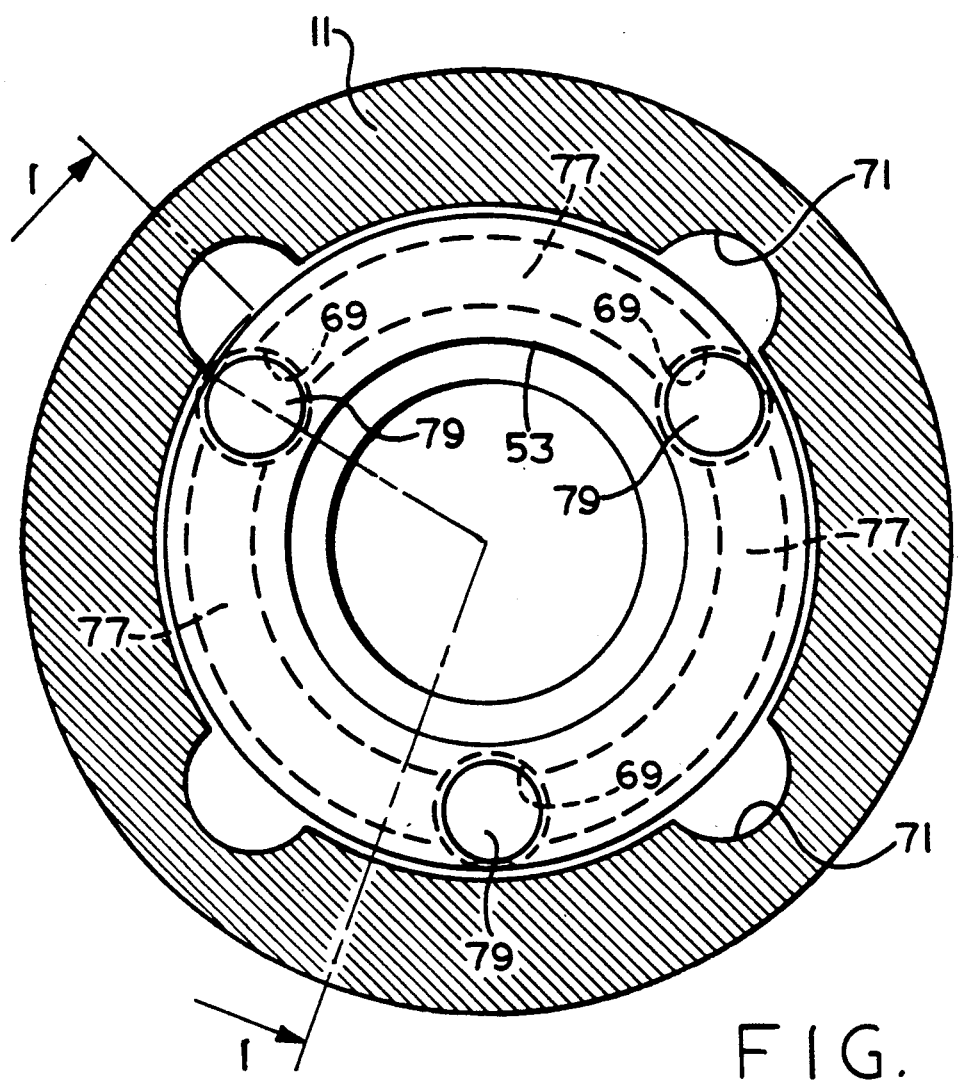
FIG. 3 is a transverse cross-section, taken on line 3—3 of FIG. 1, and on approximately the same scale, illustrating primarily the differential case, the cam balls, and inner actuating plate.

Referring now primarily to FIG. 3, the gear case 11 includes an end wall 67 (see FIG. 1) which defines three substantially identical, circular openings 69. As may best be seen by comparing FIGS. 2 and 3, with the actuating mechanism 51 in an unactuated condition (normal, straight-ahead driving), the ramp surfaces 65 are circumferentially aligned with the openings 69, i.e., each opening 69 is disposed at approximately the center (circumferentially) of its respective ramp surface 65. Disposed adjacent the end wall 67 is the inner actuating plate 53. The gear case 11 defines four half-circular recesses 71, which are adapted for receiving the "ears" of the clutch discs 43 and the clutch discs 37, thereby preventing rotation of those clutch discs relative to the gear case 11, as is generally well known in the art. The inner actuating plate 53 includes an outer surface 75 (see FIG. 5), disposed adjacent the end wall 67. The outer surface 75 defines a generally annular race groove 77 (see also FIG. 3). As is best shown in FIG. 4, disposed between the inner actuating plate 53 and the adjacent clutch disc 45 is a needle thrust bearing set 78 and a thrust race 76 (fixed to the gear case 11), which are included because the clutch discs 45 are fixed to rotate with the side gear 25, whereas the inner actuating plate 53 is freely rotatable.

As may best be seen in FIGS. 1 and 3, there are three cam balls 79, one of which is disposed in each of the openings 69, and in engagement with one of the ramp surfaces 65. In the unactuated condition illustrated in FIG. 3, each cam ball 79 is disposed substantially in the middle (circumferentially) of each of the ramp surfaces 65. Preferably, each opening 69 is just slightly oversized relative to its respective cam ball 79. It is believed that the meaning of "slightly oversized" will become readily apparent to those skilled in the art from a reading of the subsequent description of the operation of the invention.

In the device illustrated in co-pending application U.S. Ser. No. 548,317, which is incorporated herein by reference, the cam balls were disposed in arcuate cut-out portions in the end wall of the gear case, and the balls were restrained within opposed ramp surfaces defined by the inner and outer actuating plates. Therefor, in the device of the parent application, there could not be contact between the cam balls and the end wall of the gear case. However, it is one important aspect of the present invention that the circular openings 69 do engage the cam balls 79 and cooperate with the respective ramp surface 65 in causing axial motion of the cam balls 79. Therefor it is preferable that the cylindrical wall surface comprising the opening 69 be as smooth as possible to minimize frictional engagement between the wall surface and the cam ball.

Referring now primarily to FIG. 4, the actuating mechanism 51 includes an electromagnetic actuator, generally designated 81, which is illustrated in FIG. 4 as being welded to the stationary, outer differential housing H. It should be understood that the particular construction of the actuator 81 forms no part of the present invention, but instead, it is important merely that the differential mechanism includes some form of actuator which is operable, in response to an external input signal, to engage the actuating plate 55, to initiate engagement of the clutch pack 41.

The actuator 81 receives an electrical input signal by means of a pair of electrical leads 83 (and hereinafter, the electrical input signal will bear the reference numeral 83). The actuator 81 includes a housing assembly, generally designated 85, and disposed therein is an electromagnetic coil 87. The coil 87 is operable in response to the presence of the electrical input signal 83 to move an armature 89 between an unactuated position (FIG. 4A) and an actuated position (FIG. 4). Received loosely within an opening defined by the armature 89 is a brake shoe 91 which, as may best be seen in FIG. 4A, defines a pair of diverging friction surfaces 93. The friction surfaces 93 are configured to engage a pair of friction surfaces 95, defined by the outer actuating plate 55. Preferably, each of the friction surfaces 95 extends about substantially the entire circumference of the plate 55, such that frictional engagement between the plate 55 and the brake shoe 91 will occur, regardless of the instantaneous rotational position of the plate 55. It is believed to be within the ability of one skilled in the art to select an appropriate friction material for the friction surfaces 93 and 95 and, because the particular friction material is not an essential feature of the present invention, no further description thereof will be included herein. It is not even an essential feature of the present invention that the actuator 81 operate on the principle of frictional engagement. For purposes of the present invention, it is essential only that there be an actuator which is capable of causing rotation of the outer actuating plate 55 relative to the gear case 11.

Operation

When the actuator 81 receives the electrical input signal 83, the coil 87 is energized to move the armature 89 to the actuated position shown in FIG. 4. In this position, the friction surfaces 93 defined by the brake shoe 91 engage the friction surfaces 95 on the outer actuating plate 55. The result of this engagement is to cause rotation of the plate 55, relative to the gear case 11, such that the outer actuating plate 55 moves from its unactuated condition (represented in FIG. 2) to its actuated condition (FIG. 5).

Figure 5:
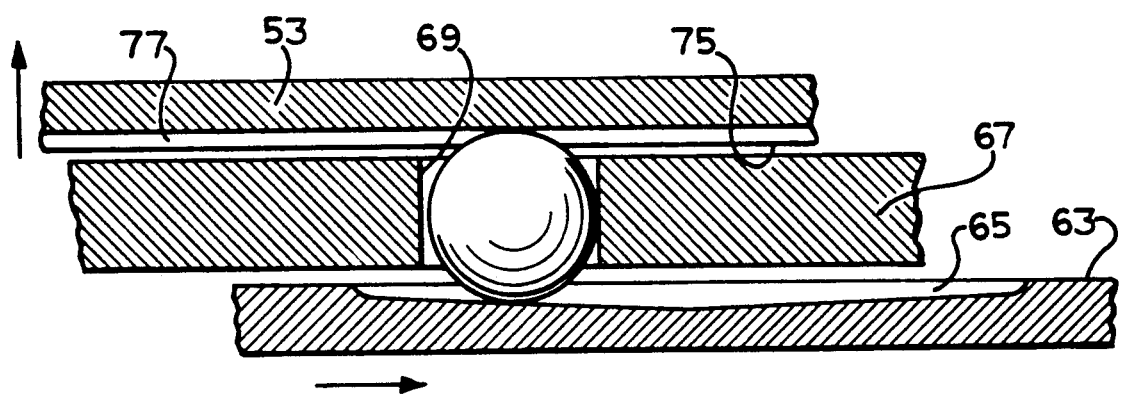
FIG. 5 is an enlarged, fragmentary, axial cross-section, taken on a plane perpendicular to that of FIG. 1, illustrating the actuating mechanism of the present invention in an actuated condition.

When the actuating plate 55 rotates relative to the gear case 11 and moves to the actuated condition shown in FIG. 5, there is a ramping action of each of the cam balls 79 along the ramp surfaces 65, resulting in axial movement of the cam balls 79 because the outer actuating plate 55 is axially restrained between the end wall 67 and the bearing retainer 57. Therefore, the only possible axial motion is for the cam balls to move further axially inward (to the left in FIG. 1, and upward in FIG. 5). Such movement of the balls 79 results in a similar movement of the inner actuating plate 53 (see the arrow in FIG. 5). Such movement of the actuating plate 53 results in loading of the clutch pack 41, increasing the force applied to engage the clutch discs 43 and 45, thus increasing the bias torque of the differential.

As the cam balls 79 roll "up" the ramp surfaces 65, there is a certain amount of frictional engagement between the balls and the ramp surfaces which induces rotation of the cam balls. At the same time, the cam balls are in engagement with some portion of the cylindrical wall surface comprising the openings 69 (see FIG. 5). Therefor, the rolling action of the cam balls 79 against the surface of the openings 69 results in a certain amount of additional (but undesirable) friction, as the cam balls 79 also move upward in FIG. 5 (or axially inward in FIGS. 1 and 4). The frictional engagement between the cam balls and the surface of the openings 69 must be taken into account when determining the amount of force to be applied by the actuator 81 (the amount of torque to be applied to the outer actuating plate 55). Therefor, it is desirable to provide a relatively smooth surface for the openings 69 to minimize the friction between the wall surface and the cam balls, in view of the fact that the cam balls are in engagement with the wall surface of the openings 69 at any time that the outer actuating plate 55 is rotating at a different speed than the gear case 11.

Preferably, the total circumferential extent of the ramp surfaces 65 in the present invention is greater than in the device illustrated in the parent application. In the device of the parent application, with both actuating plates defining ramp surfaces, there was a greater total axial travel for any particular relative rotation of the outer actuating plate and the gear case. In the present invention, with only the outer actuating plate 55 defining ramp surfaces, one way to compensate for the loss of axial travel is to increase the ramp "length", i.e., the circumferential extent of each ramp surface 65.

It is an important aspect of the present invention that the cam ball and ramp surface arrangement makes it possible to truly modulate the bias torque. The particular actuated condition illustrated in FIG. 5 corresponds to a particular level of torque bias. If even greater force were applied by the actuator 81, engaging the friction surfaces 93 and 95, the actuating plate 55 would move further to the right in FIG. 5, and the actuating plate 53 would move further upward in FIG. 5, resulting in even greater bias torque.

Another important aspect of the present invention is the compact construction, which simplifies and makes more compact the entire differential, partly because the end wall 67 then acts as a "cage" surrounding the cam balls 79 and restraining them in the radial and circumferential directions, in addition to being involved in directing the movement of the cam balls in the axial direction.

Another important aspect of the present invention is that the outer actuating plate 55 normally rotates with the gear case 11, and at the same speed, thus inherently providing the rotational input torque, which is then translated into axial force to bias the clutch pack 41.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

We claim:

1. A differential gear mechanism of the type including a gear case defining an axis of rotation and a gear chamber; differential gear means disposed in said gear chamber including at least one input gear and first and second output gears; means for limiting differentiating action of said differential gear means in response to an input signal, said limiting means including clutch means operable between a disengaged condition and an engaged condition, effective to retard relative rotation between said output gear and said gear case; actuating means comprising first and second actuating plates defining a ball and ramp actuator, wherein rotation of said second actuating plate from an unactuated condition to an actuated condition is effective to bias said clutch means toward said engaged condition; characterized by:

(a) said second actuating plate being disposed, in said unactuated condition, to rotate with said gear case;
 (b) said ball and ramp actuator comprising a plurality of cam balls, and said second actuating plate defining a plurality of ramp surfaces;
 (c) said gear case including an end wall disposed adjacent said second actuating plate, and oriented generally perpendicular to said axis of rotation, said end wall defining a plurality of openings, each of said openings having one of said cam balls disposed therein, and being slightly oversized relative to said cam ball;
 (d) means disposed within said gear case and operable to transmit axial movement of said cam balls to move said clutch means toward said engaged condition; and
 (e) an actuator disposed adjacent said gear case and including means operable in response to said input signal to move from an unactuated position, in which said second actuating plate is in said unactuated condition, to an actuated position in which said means is in operable association with said second actuating plate, effective to cause relative rotation between said second actuating plate and said gear case, to move said second actuating plate to said actuated condition.

2. A differential gear mechanism as claimed in claim 1 characterized by said actuator comprising an electromagnetic actuator and said input signal comprising an electrical input signal.

3. A differential gear mechanism as claimed in claim 1 characterized by said clutch means comprising a plurality of clutch discs disposed axially between said second output gear and said gear case, one portion of said clutch discs being in engagement with said gear case, and another portion of said clutch discs being in engagement with said second output gear.

4. A differential gear mechanism as claimed in claim 1 characterized by said first actuating plate being disposed within said gear case, and said second actuating plate being disposed external to said gear case.

5. A differential gear mechanism as claimed in claim 4 characterized by said first actuating plate comprising a ball race member defining an annular race groove disposed to be in engagement with said cam balls.

6. A differential gear mechanism as claimed in claim 4 characterized by said gear case including means operable to prevent substantial axial movement of said second actuating plate, relative to said gear case, while permitting rotational movement of said second actuating plate, relative to said gear case.

7. A differential gear mechanism as claimed in claim 1 characterized by each of said openings in said end wall being circumferentially aligned with one of said ramp surfaces when said second actuating plate is in said unactuated condition.

8. A differential gear mechanism as claimed in claim 7 characterized by each of said openings comprising a generally cylindrical wall surface oriented generally parallel to said axis of rotation of said gear case, each of said ramp surfaces cooperating with a portion of said cylindrical wall surface to define an acute included angle.

* * * * *